United States Patent
Chen et al.

(10) Patent No.: US 11,250,235 B2
(45) Date of Patent: Feb. 15, 2022

(54) UNDER DISPLAY LIGHT FIELD SENSOR, DEVICE WITH UNDER DISPLAY LIGHT FIELD SENSOR FOR SENSING FINGERPRINT OR TOUCH, AND METHOD FOR RECONSTRUCTING IMAGE

(71) Applicant: NOVATEK Microelectronics Corp., Hsinchu (TW)

(72) Inventors: I-Hsiu Chen, Taipei (TW); Ching-Kuan Chiu, Hsinchu County (TW)

(73) Assignee: NOVATEK Microelectronics Corp., Hsinchu (TW)

( * ) Notice: Subject to any disclaimer, the term of this patent is extended or adjusted under 35 U.S.C. 154(b) by 0 days.

(21) Appl. No.: 16/997,888

(22) Filed: Aug. 19, 2020

(65) Prior Publication Data
US 2021/0326566 A1 Oct. 21, 2021

Related U.S. Application Data

(60) Provisional application No. 63/011,313, filed on Apr. 17, 2020.

(51) Int. Cl.
*G06K 9/00* (2006.01)
*G06F 3/042* (2006.01)

(52) U.S. Cl.
CPC ......... *G06K 9/00026* (2013.01); *G06F 3/042* (2013.01)

(58) Field of Classification Search
CPC .............................. G06K 9/00026; G06F 3/042
See application file for complete search history.

(56) References Cited

U.S. PATENT DOCUMENTS

| | | | |
|---|---|---|---|
| 2007/0154072 A1* | 7/2007 | Taraba | G06K 9/00026 382/124 |
| 2014/0218327 A1* | 8/2014 | Shi | G06F 3/041 345/174 |
| 2015/0301688 A1* | 10/2015 | Cho | B60K 37/00 345/175 |
| 2018/0012069 A1* | 1/2018 | Chung | G06K 9/2036 |
| 2018/0301494 A1* | 10/2018 | Park | H01L 27/3234 |
| 2020/0160025 A1* | 5/2020 | Dangy-Caye | G06K 9/00087 |
| 2020/0380237 A1* | 12/2020 | Nilsson | G06K 9/0004 |
| 2021/0056284 A1* | 2/2021 | Jiang | G06K 9/00026 |
| 2021/0064841 A1* | 3/2021 | Kim | G06F 1/16 |
| 2021/0133423 A1* | 5/2021 | Zhang | G06K 9/00033 |
| 2021/0174057 A1* | 6/2021 | Tsai | G06K 9/00067 |
| 2021/0175271 A1* | 6/2021 | Lee | H01L 27/14623 |

* cited by examiner

*Primary Examiner* — Premal R Patel
(74) *Attorney, Agent, or Firm* — CKC & Partners Co., LLC

(57) ABSTRACT

An under display light field sensor is for sensing a fingerprint or touch on or in proximity to a display panel. The under display light field sensor includes a light-field image sensor and a plurality of micro-lenses on the subarrays of the sensing pixels. The light-field image sensor includes a plurality of subarrays of sensing pixels under the display panel. The sensing pixels in an identical one of the subarrays are configured to capture images of an object on or in proximity to the display panel by sensing lights from different directions. Each of the micro-lenses corresponds to one of the subarrays of the sensing pixels.

30 Claims, 21 Drawing Sheets

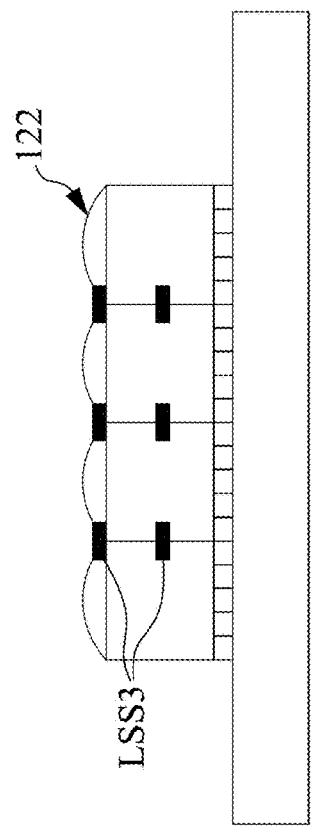

FIG. 10

| SA2 | | | | | |
|---|---|---|---|---|---|
| (2,1) a11 | (2,2) a12 | (2,3) a13 | (2,4) a14 | (2,5) a15 |
| (2,6) a21 | (2,7) a22 | (2,8) a23 | (2,9) a24 | (2,10) a25 |
| (2,11) a31 | (2,12) a32 | (2,13) a33 | (2,14) a34 | (2,15) a35 |
| ⋮ | ⋮ | ⋮ | | |
| ⋮ | ⋮ | ⋮ | (2,24) a54 | (2,25) a55 |

SAN

| SA1 | | | | | |
|---|---|---|---|---|---|
| (1,1) a11 | (1,2) a12 | (1,3) a13 | (1,4) a14 | (1,5) a15 |
| (1,6) a21 | (1,7) a22 | (1,8) a23 | (1,9) a24 | (1,10) a25 |
| (1,11) a31 | (1,12) a32 | (1,13) a33 | (1,14) a34 | (1,15) a35 |
| ⋮ | ⋮ | ⋮ | | |
| ⋮ | ⋮ | ⋮ | (1,24) a54 | (1,25) a55 |

1211

| SA201 | | | | | |
|---|---|---|---|---|---|
| (201,1) a11 | (201,2) a12 | (201,3) a13 | (201,4) a14 | (201,5) a15 |
| (201,6) a21 | (201,7) a22 | (201,8) a23 | (201,9) a24 | (201,10) a25 |
| (201,11) a31 | (201,12) a32 | (201,13) a33 | (201,14) a34 | (201,15) a35 |
| ⋮ | ⋮ | ⋮ | | |
| ⋮ | ⋮ | ⋮ | (201,24) a54 | (201,25) a55 |

MUSB2

| (1,2) | (2,2) | (3,2) | ⋮ | (199,2) | (200,2) |
|---|---|---|---|---|---|
| (201,2) | (202,2) | (203,2) | ⋮ | (399,2) | (400,2) |
| (401,2) | (402,2) | (403,2) | ⋮ | ⋮ | (603,2) |

⋯

| ⋮ | ⋮ | ⋮ | ⋮ | ⋮ | ⋮ |
|---|---|---|---|---|---|
| ⋮ | ⋮ | ⋮ | ⋮ | ⋮ | ⋮ |
| (39801,2) | (39802,2) | ⋮ | ⋮ | ⋮ | (40000,2) |

FIG. 12

MUSB25

| (1,25) | (2,25) | (3,25) | ... | ... | ... | ... |
|--------|--------|--------|-----|-----|-----|-----|
| (201,25) | (202,25) | (203,25) | ... | ... | ... | ... |
| (401,25) | (402,25) | (403,25) | ... | ... | ... | ... |
| ... | ... | ... | ... | ... | ... | ... |
| (199,25) | (200,25) | ... | ... | ... | ... | ... |
| (399,25) | (400,25) | ... | ... | ... | ... | ... |
| ... | (603,25) | ... | ... | ... | (39801,25) | (39802,25) |
| ... | ... | ... | ... | ... | ... | (40000,25) |

FIG. 13

| MSUB1 | MSUB2 | | | | MSUB25 |
|---|---|---|---|---|---|
| (18,18) | (8,18) | (0,18) | (-8,18) | (-18,18) | |
| (18,8) | (8,8) | (0,8) | (-8,8) | (-18,8) | |
| (18,0) | (8,0) | (0,0) | (-8,0) | (-18,0) | |
| (18,-8) | (8,-8) | (0,-8) | (-8,-8) | (-18,-8) | |
| (18,-18) | (8,-18) | (0,-18) | (-8,-18) | (-18,-18) | |

FIG. 15

UNDER DISPLAY LIGHT FIELD SENSOR, DEVICE WITH UNDER DISPLAY LIGHT FIELD SENSOR FOR SENSING FINGERPRINT OR TOUCH, AND METHOD FOR RECONSTRUCTING IMAGE

RELATED APPLICATIONS

This application claims priority to U.S. Provisional Application Ser. No. 63/011,313, filed Apr. 17, 2020, which is herein incorporated by reference.

BACKGROUND

Technical Field

The present disclosure relates to sensing technology. More particularly, the present disclosure relates to an under display light field sensor for sensing a fingerprint or touch, a device with the under display light field sensor, and a method for reconstructing an image.

Description of Related Art

With development of technology, the fingerprint sensing and the fingerprint identification function are applied to many applications. In some related approaches, a sensor under a display panel is utilized to sense a fingerprint on the display panel. However, due to the structure of the display panel, interference will affect the sensed image(s).

SUMMARY

Some aspects of the present disclosure are to provide an under display light field sensor. The under display light field sensor is for sensing a fingerprint or touch on or in proximity to a display panel. The under display light field sensor includes a light-field image sensor and a plurality of micro-lenses on the subarrays of the sensing pixels. The light-field image sensor includes a plurality of subarrays of sensing pixels under the display panel. The sensing pixels in an identical one of the subarrays are configured to capture images of an object on or in proximity to the display panel by sensing lights from different directions. Each of the micro-lenses corresponds to one of the subarrays of the sensing pixels.

Some aspects of the present disclosure are to provide a device with an under display light field sensor for sensing a fingerprint or touch. The device further includes a display panel. The display panel includes a display surface and a back surface opposite thereto. The under display light field sensor includes a plurality of subarrays of sensing pixels and a plurality of micro-lenses. The subarrays of sensing pixels face the back surface. The micro-lenses are between the subarrays of the sensing pixels and the back surface. Each of the micro-lenses corresponds to one of the subarrays of the sensing pixels. The sensing pixels in an identical one of the subarrays are configured to capture images of an object on or in proximity to the display panel by sensing lights from different directions.

Some aspects of the present disclosure are to provide a method for reconstructing an image sensed by a under display light field sensor for sensing a fingerprint or touch on or in proximity to a display panel. The under display light field sensor includes a light-field image sensor including a plurality of subarrays of sensing pixels under the display panel and a plurality of micro-lenses. The sensing pixels in an identical one of the subarrays are configured to capture images of an object on or in proximity to the display panel from different directions. The micro-lenses are on the subarrays of the sensing pixels. Each of the micro-lenses corresponds to one of the subarrays of the sensing pixels. The method includes the following steps: acquiring an initial image, generating a plurality of sub-images of the object according to the initial image; acquiring respective off-sets of the sub-images of the object; correcting the sub-images of the object by using the respective off-sets to generate a plurality of corrected sub-images; and reconstructing the corrected sub-images to generate a reconstructed image.

BRIEF DESCRIPTION OF THE DRAWINGS

The disclosure can be more fully understood by reading the following detailed description of the embodiment, with reference made to the accompanying drawings as follows:

FIG. 3A-FIG. 3C are schematic diagrams illustrating under display light field sensors according to some embodiments of the present disclosure.

FIG. 10 is a schematic diagram illustrating subarrays of sensing pixels according to some embodiments of the present disclosure.

FIG. 12 is a schematic diagram illustrating a sub-image according to some embodiments of the present disclosure.

FIG. 13 is a schematic diagram illustrating a sub-image according to some embodiments of the present disclosure.

FIG. 15 is a schematic diagram illustrating offsets according to some embodiments of the present disclosure.

DETAILED DESCRIPTION

Figure 1:
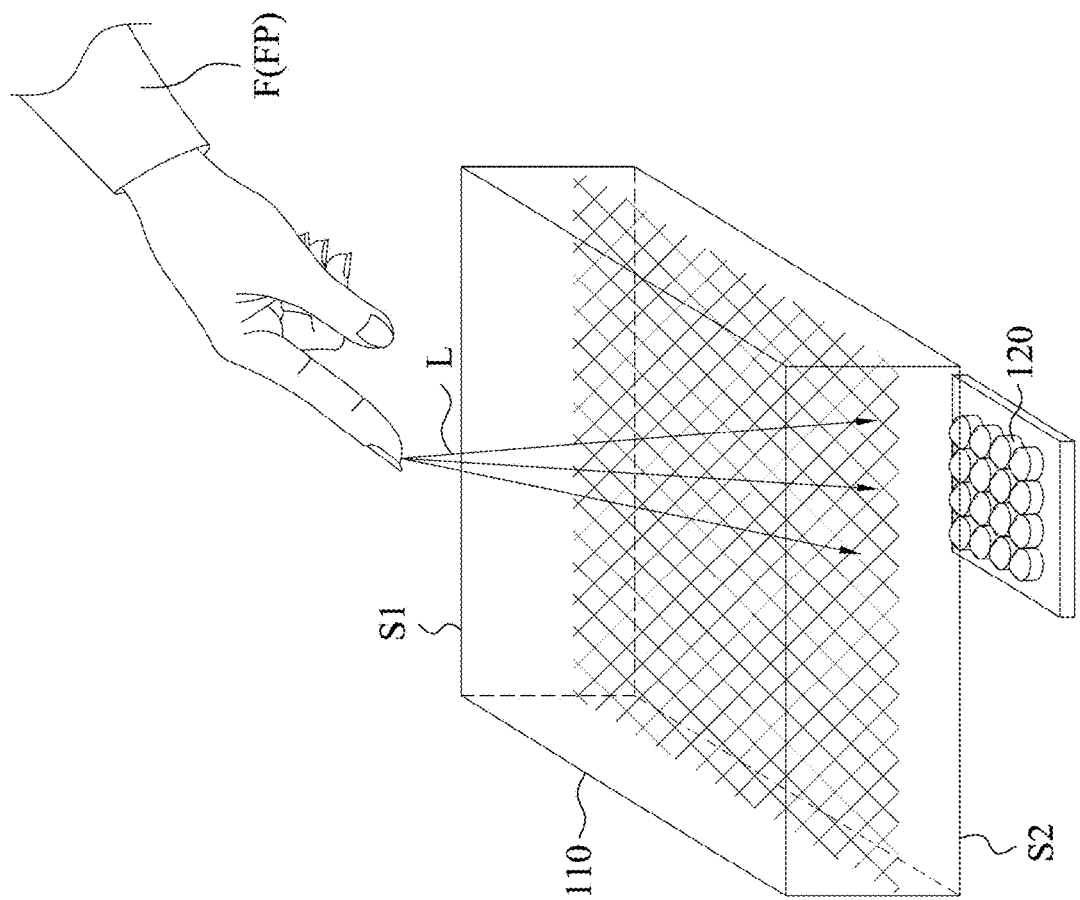
FIG. 1 is a schematic diagram illustrating a fingerprint identification system according to some embodiments of the present disclosure.

Reference is now made in detail to the present embodiments of the disclosure, examples of which are illustrated in the accompanying drawings. Wherever possible, the same reference numbers are used in the drawings and the description to refer to the same or like parts. The embodiments below are described in detail with the accompanying drawings, but the examples provided are not intended to limit the scope of the disclosure covered by the description. The structure and operation are not intended to limit the execution order. Any structure regrouped by elements, which has an equal effect, is covered by the scope of the present disclosure.

In the present disclosure, "connected" or "coupled" may refer to "electrically connected" or "electrically coupled." "Connected" or "coupled" may also refer to operations or actions between two or more elements.

Reference is made to FIG. 1. FIG. 1 is a schematic diagram illustrating a fingerprint identification system 100 according to some embodiments of the present disclosure. As illustrated in FIG. 1, the fingerprint identification system 100 includes a display panel 110 and an under display light field sensor 120. The display panel 110 has a display surface S1 and a back surface S2 opposite thereto. The display surface S1 is configured for displaying an image. The under display light field sensor 120 may be disposed below the display panel 110 and faces the back surface S2. The under display light field sensor 120 (for example, implemented as a fingerprint sensor) is configured for sensing a target object (for example, a fingerprint FP of a finger F) on the display panel 110 or in proximity to the display panel 110. For example, the under display light field sensor 120 can senses light L emitted from different directions for the object (for example, the fingerprint FP). The sensed information can be utilized to identify the object (for example, the fingerprint FP).

In some embodiments, the target object sensed by the under display light field sensor 120 is not limited to the fingerprint FP, and the target object sensed by the under display light field sensor 120 may be other object.

In some related approaches, due to the structure of the display panel, interference will affect the sensed image(s). A solution is to utilize hardware or software to eliminate interference caused by the structure of the display panel according to the difference between the spatial frequency of the structure of the display panel and the spatial frequency of the target object. However, the aforementioned method cannot eliminate the interference when the spatial frequency of the structure of the display panel is close to the spatial frequency of the target object. In addition, interference cannot be eliminated completely due to Moire pattern, Newton ring, or MURA pattern.

Compared to the aforementioned related approaches, in the fingerprint identification system 100 of the present disclosure, since the light L is emitted from the different directions for the object (for example, the fingerprint FP) and the light L passes through different positions in the structure of the display panel 110, the light L would not be blocked by the same position in the structure of the display panel 110. Therefore, effects caused by the structure of the display panel 110 can be reduced.

In some embodiments, the under display light field sensor 120 can sense intensity of the light L and the directions of the light L, and the sensed information can be collected and utilized to identify the object (for example, the fingerprint FP). Since the intensity of the light L and the directions of the light L are sensed and recorded, distance information of the object (for example, the fingerprint FP) can be obtained according to phase differences corresponding to the recorded information.

Figure 2A:
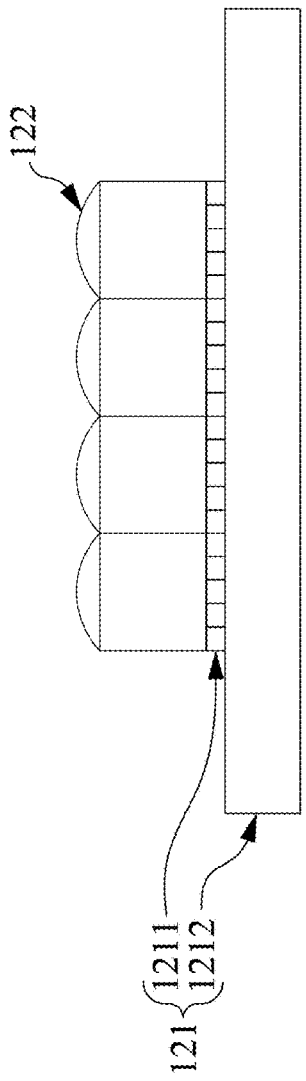
FIG. 2A is a schematic diagram illustrating an under display light field sensor according to some embodiments of the present disclosure.
Figure 2B:
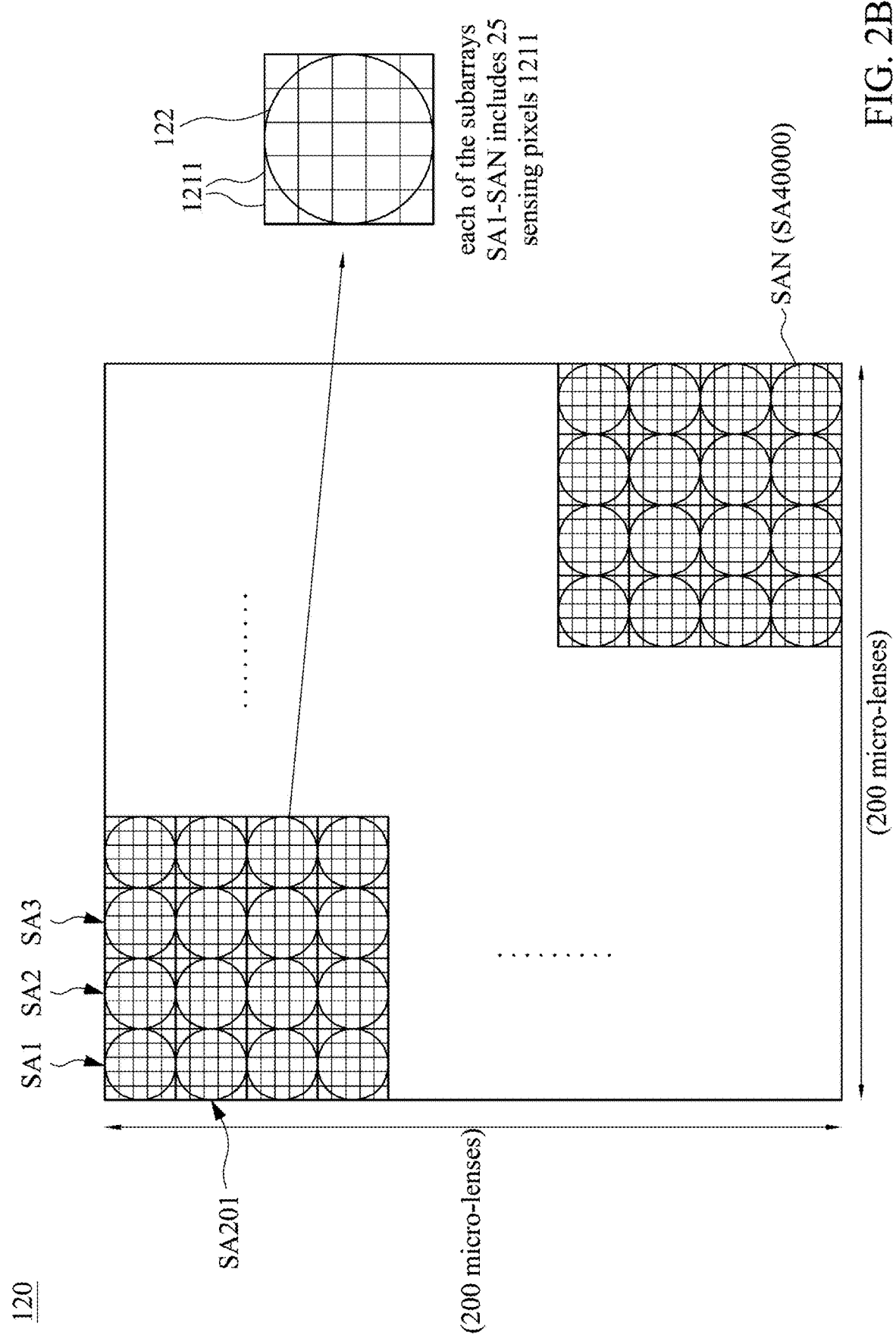
FIG. 2B is a top view diagram illustrating the under display light field sensor in FIG. 2A according to some embodiments of the present disclosure.

References are made to FIG. 2A and FIG. 2B. FIG. 2A is a schematic diagram illustrating the under display light field sensor 120 according to some embodiments of the present disclosure. FIG. 2B is a top view diagram illustrating the under display light field sensor 120 in FIG. 2A according to some embodiments of the present disclosure. As illustrated in FIG. 2A, the under display light field sensor 120 includes a light-field image sensor 121 and micro-lenses 122. The light-field image sensor 121 includes sensing pixels 1211 and a substrate 1212. The sensing pixels 1211 may be disposed under the display panel 110 on the substrate 1212 and face the back side S2 of the display panel 110 in FIG. 1. As illustrated in FIG. 2B, the sensing pixels 1211 are divided into subarrays SA1-SAN, in which N is a positive integer greater than 1. The sensing pixels 1211 in each of the subarrays SA1-SAN are configured to capture images of the object (for example, the fingerprint FP) from different directions illustrated in FIG. 1. The micro-lenses 122 are attached on the subarrays SA1-SAN, and each of the micro-lenses 122 corresponds to one of the subarrays SA1-SAN. In this example, the under display light field sensor 120 includes 40000 subarrays, and each of the subarrays SA1-SAN includes 25 sensing pixels 1211.

The quantity (for example, 40000) of the subarrays in the under display light field sensor 120 is merely for illustration and the present disclosure is not limited thereto. Various quantities of the subarrays in the under display light field sensor 120 are within the contemplated scopes of the present disclosure.

The quantity (for example, 25) of the sensing pixels 1211 in one of the subarrays SA1-SAN is merely for illustration and the present disclosure is not limited thereto. Various quantities of the sensing pixels 1211 in one of the subarrays SA1-SAN are within the contemplated scopes of the present disclosure.

In some embodiments, the light-field image sensor 121 is implemented by a backside illumination (BSI) sensor or a front side illumination (FSI) sensor. In some embodiments, the light-field image sensor 121 is with imaging lens. In some embodiments, the sensing pixels 1211 are global shutter pixels or rolling shutter pixels. In some embodiments, an additional light source is added in the under display light field sensor 120 in addition to the light source (for example, a backlight module) of the display panel 110.

Figure 3A:
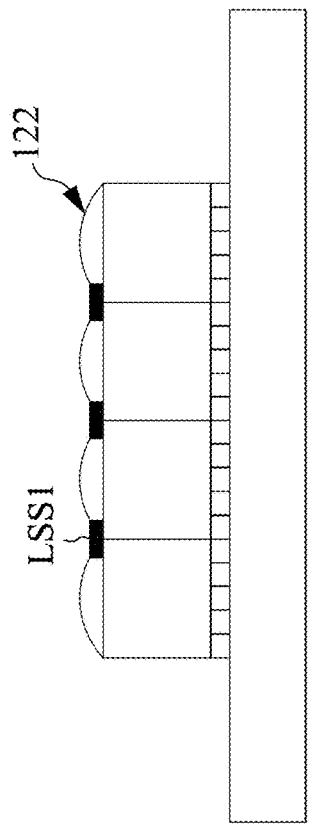

Reference is made to FIG. 3A. FIG. 3A is a schematic diagram illustrating a under display light field sensor 120A according to some embodiments of the present disclosure. As illustrated in FIG. 3A, in some embodiments, a light shielding structure LSS1 including portions is disposed between adjacent two of the micro-lenses 122. With the light shielding structure LSS1, light from one of the two micro-lenses 122 is not interfered by light from another one of the two micro-lenses 122. Therefore, optical crosstalk can be avoided.

Figure 3B:
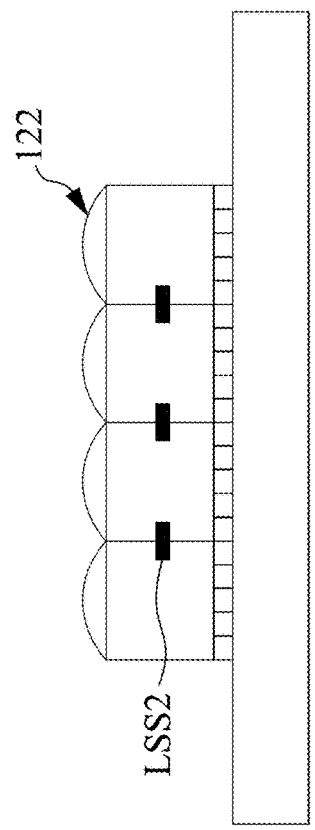

Reference is made to FIG. 3B. FIG. 3B is a schematic diagram illustrating a under display light field sensor 120B according to some embodiments of the present disclosure. As illustrated in FIG. 3B, in some embodiments, a light shielding structure LSS2 including portions is disposed under adjacent ones of the micro-lenses 122. In different embodiments, the distances from the light shielding structure LSS2 to the micro-lenses can be adjusted according to design requirements. In addition, the light shielding structure LSS2 may be extended to be longer, for example, from a position between two adjacent micro-lenses 122 to the positions of the pixels. Similarly, with the light shielding structure LSS2, light from one of the two micro-lenses 122 is not interfered by light from another one of the two micro-lenses 122. Therefore, optical crosstalk can be avoided.

Reference is made to FIG. 3C. FIG. 3C is a schematic diagram illustrating a under display light field sensor 120C according to some embodiments of the present disclosure. In different embodiments, the distances from the light shielding structure LSS3 to the micro-lenses can be adjusted according to design requirements. In addition, the light shielding structure LSS3 may be extended to be longer, for example, from a position between two adjacent micro-lenses 122 to the positions of the pixels. In some embodiments, the light shielding structure LSS1 in FIG. 3A and the light shielding structure LSS2 in FIG. 3B can be combined to form a new light shielding structure LSS3 in FIG. 3C. In other words, the new light shielding structure LSS3 includes portions between adjacent two of the micro-lenses 122 and the portions below.

Figure 4:
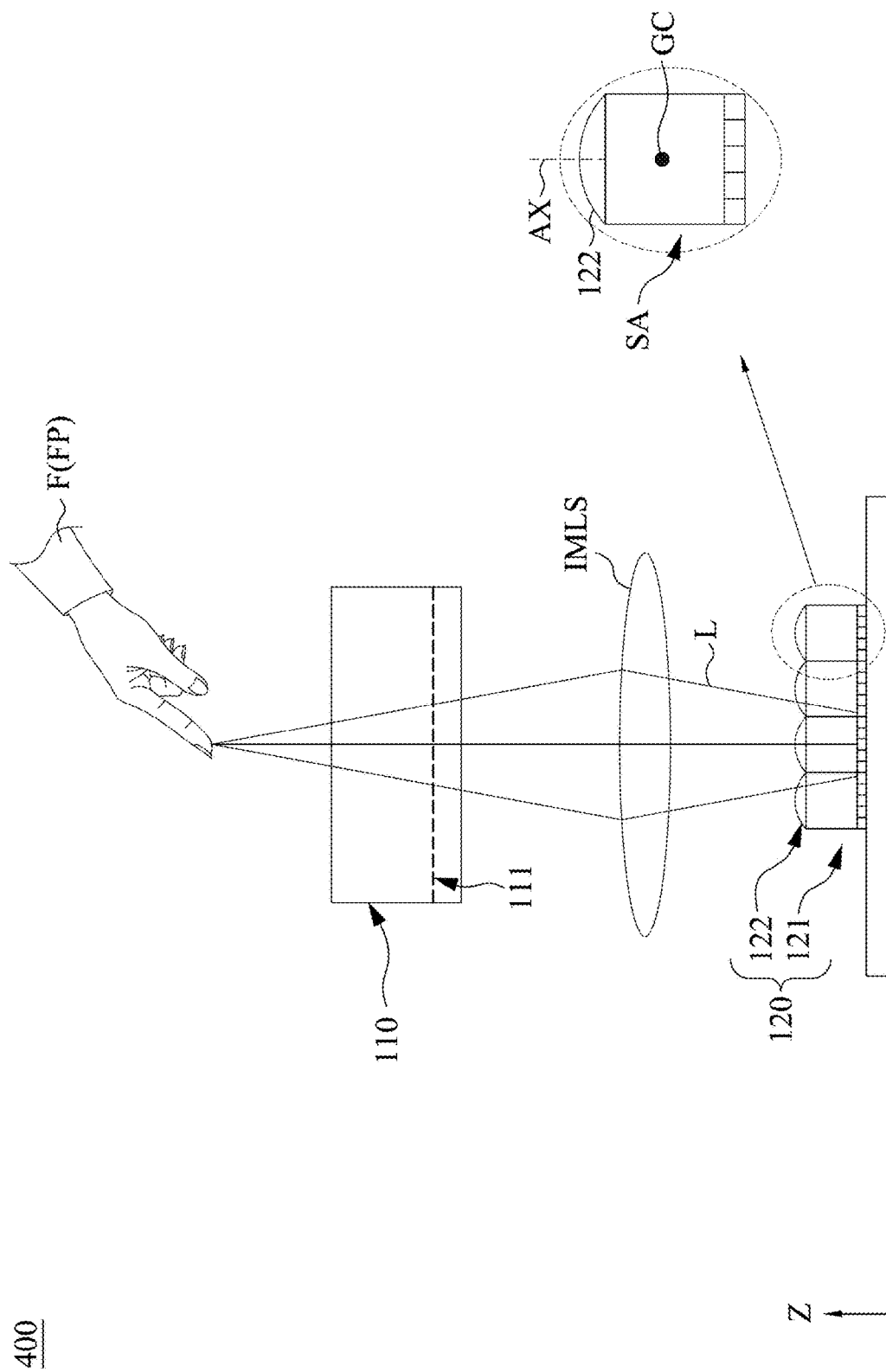
FIG. 4 is a schematic diagram illustrating a fingerprint identification system according to some embodiments of the present disclosure.

Reference is made to FIG. 4. FIG. 4 is a schematic diagram illustrating a fingerprint identification system 400 according to some embodiments of the present disclosure. Similarly, not only the fingerprint identification system 400 can reduce effects caused by the structure of the display panel 110, but also the under display light field sensor 120 of the fingerprint identification system 400 can be utilized for performing a floating touch function. In other words, the finger F does not need to contact to the display panel 110. As illustrated in FIG. 4, the finger F is over the display panel 110 and the display panel 110 includes panel pixels 111. An imaging lens IMLS is disposed over the micro-lenses 122 and below the panel pixels 111. The imaging lens IMLS is configured for forming an image of the object (for example, the fingerprint FP) on the light-field image sensor 121. The image lens IMLS can provide a greater field of view (FOV) and a better resolution. The light-field image sensor 121 senses the light L transmitted through the imaging lens IMLS and the under display light field sensor 120 calculates a vertical distance (for example, in a direction Z) from the under display light field sensor 120 to the object (for example, the fingerprint FP). With a coordinate, on a plane formed by a direction X and a direction Y, of the under display light field sensor 120, movements of the finger F in the three-dimensional space can be tracked, so as to achieve the floating touch function. In this example, each of the micro-lenses 122 has an axis AX, and the axis AX is substantially aligned with a geometric center GC of the corresponding subarray SA.

Figure 5:
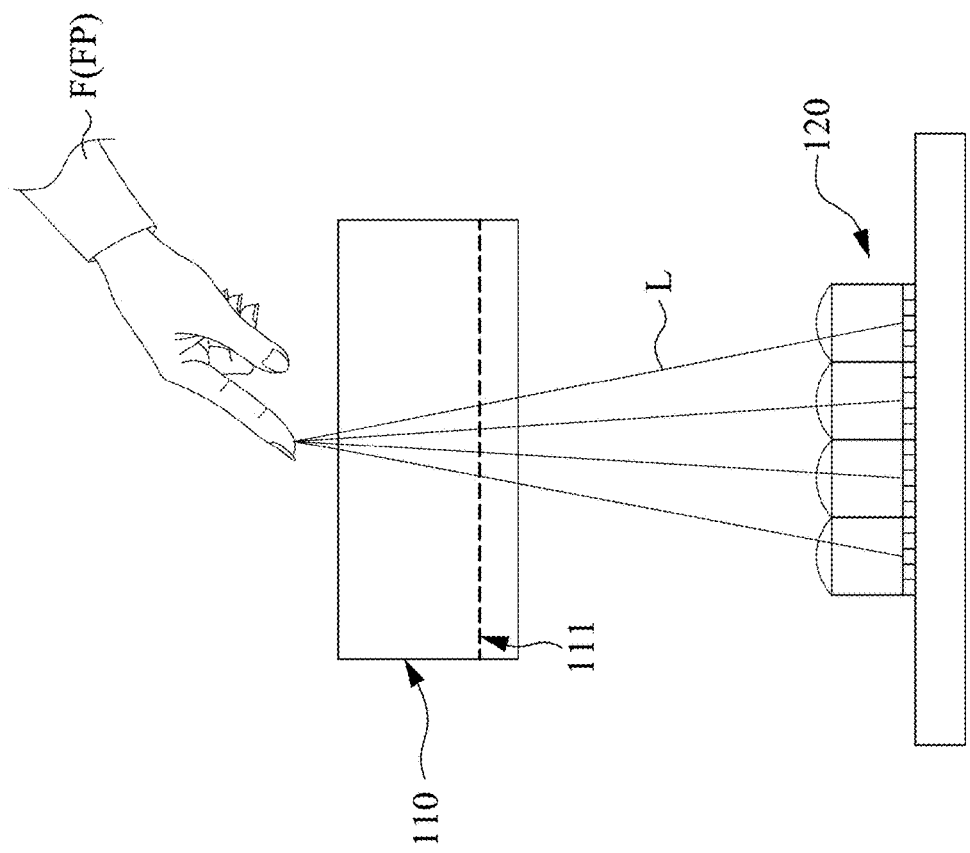
FIG. 5 is a schematic diagram illustrating a fingerprint identification system according to some embodiments of the present disclosure.

Reference is made to FIG. 5. FIG. 5 is a schematic diagram illustrating a fingerprint identification system 500 according to some embodiments of the present disclosure. Similarly, the fingerprint identification system 500 not only can reduce effects caused by the structure of the display panel 110, but also can reduce the overall height. In other words, compared to the fingerprint identification system 400 in FIG. 4, the fingerprint identification system 500 in FIG. 5 is configured without the lens L, such that the overall height of the fingerprint identification system 500 in FIG. 5 can be reduced.

Figure 6:
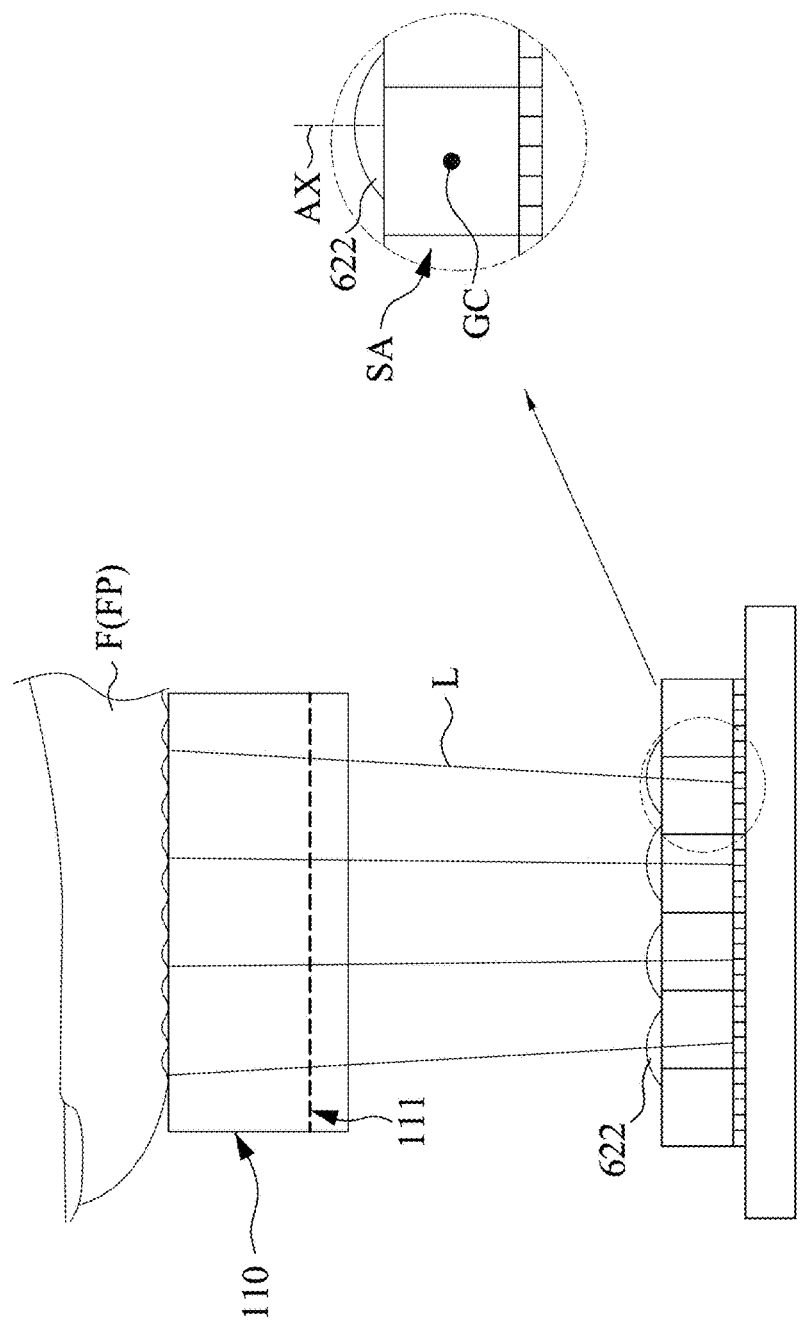
FIG. 6 is a schematic diagram illustrating a fingerprint identification system with micro-lenses shifted outward according to some embodiments of the present disclosure.

Reference is made to FIG. 6. FIG. 6 is a schematic diagram illustrating a fingerprint identification system 600 with micro-lenses 622 shifted outward according to some embodiments of the present disclosure. As illustrated in FIG. 6, the micro-lens 622 has an axis AX, and the axis AX is shifted outward from a geometric center GC of the corresponding subarray SA. In this configuration, a sensed area (for example, area of the light L) can be larger.

Figure 7:
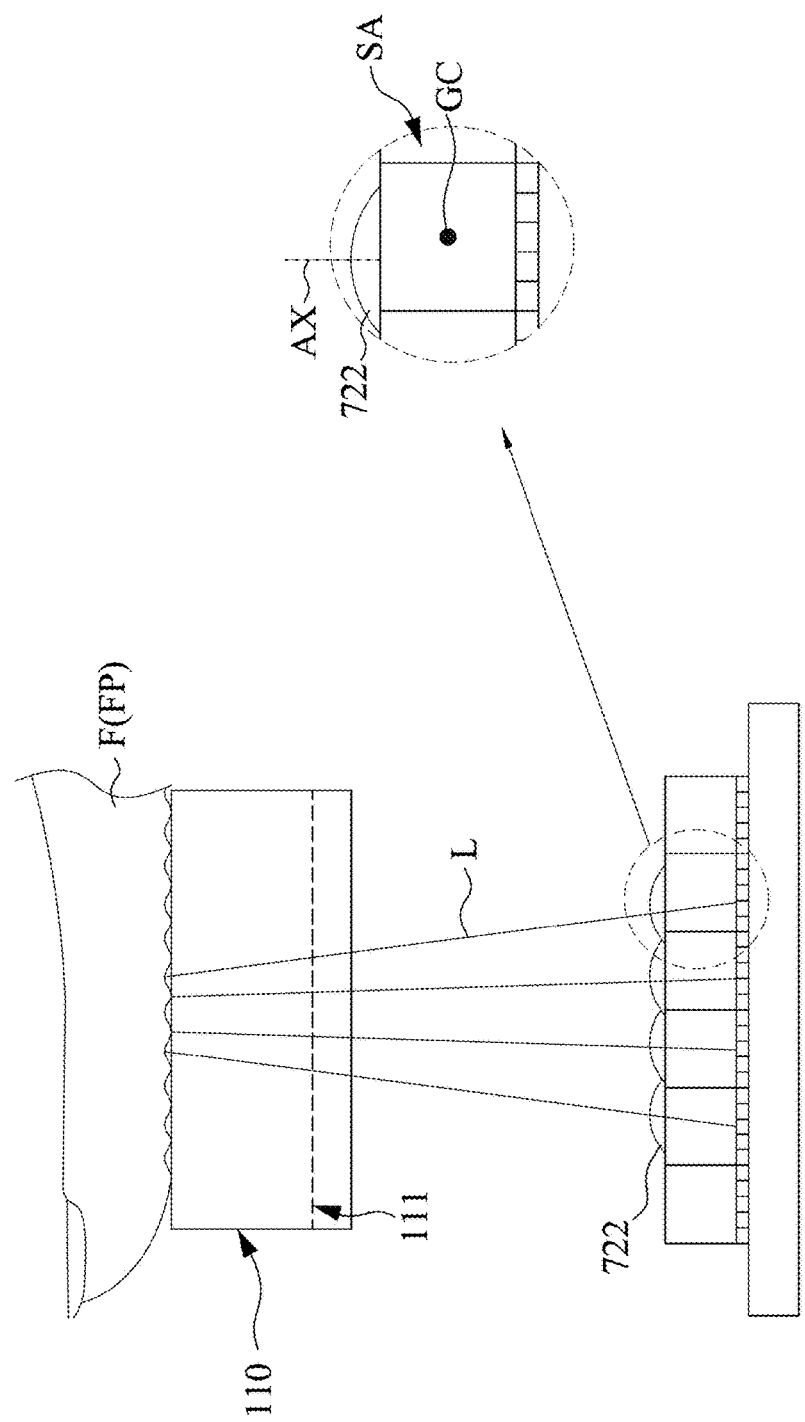
FIG. 7 is a schematic diagram illustrating a fingerprint identification system with micro-lenses shifted inward according to some embodiments of the present disclosure.

Reference is made to FIG. 7. FIG. 7 is a schematic diagram illustrating a fingerprint identification system 700 with micro-lenses 722 shifted inward according to some embodiments of the present disclosure. As illustrated in FIG. 7, the micro-lens 722 has an axis AX, and the axis AX is shifted inward from a geometric center GC of the corresponding subarray SA. In this configuration, the light L is concentrated in a smaller sensed area and the sampling frequency is increased. Therefore, the signal-to-noise ratio (SNR) of the fingerprint identification system 700 can be higher.

Figure 8:
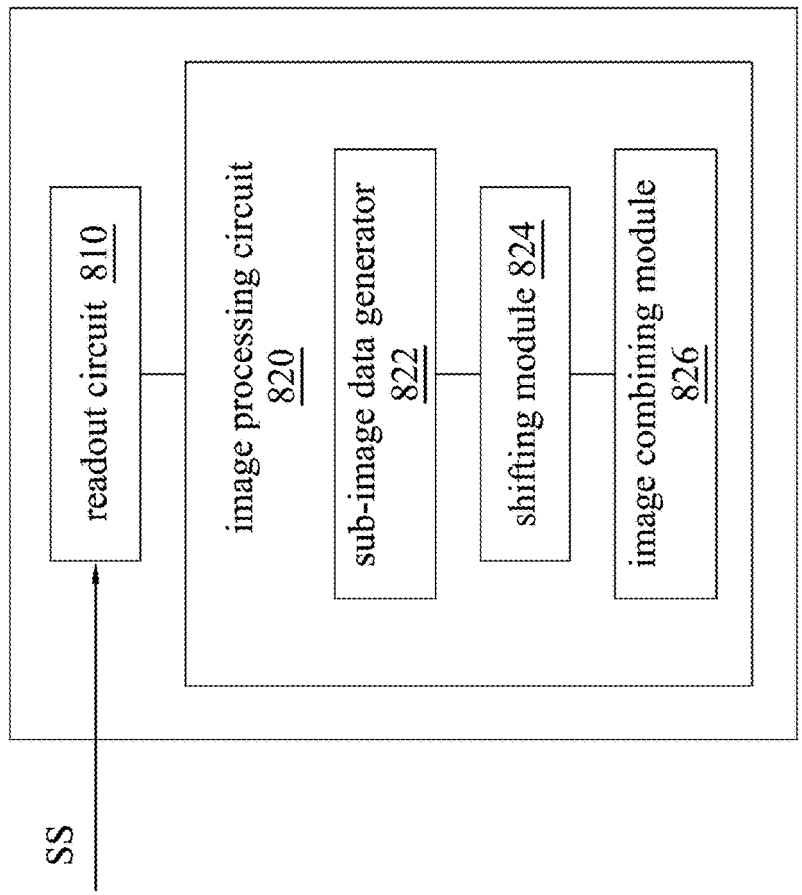
FIG. 8 is a schematic diagram illustrating a sensing circuit according to some embodiments of the present disclosure.

Reference is made to FIG. 8. FIG. 8 is a schematic diagram illustrating a sensing circuit 800 according to some embodiments of the present disclosure. The sensing circuit 800 is coupled to the sensing pixels 1211. As illustrated in FIG. 8, the sensing circuit 800 includes a readout circuit 810 and an image processing circuit 820. The image processing circuit 820 is coupled to the readout circuit 810. The image processing circuit 820 includes a sub-image data generator 822, a shifting module 824, and an image combining module 826. The shifting module 824 is couple to the sub-image data generator 822 and the image combining module 826. In some embodiments, the sub-image data generator 822, the shifting module 824, and the image combining module 826 may be implemented by hardware (for example, circuits), software, firmware, or a combination thereof.

References are made to FIGS. 1-3 and FIG. 8. The readout circuit 810 reads out sensing signals SS of the sensing pixels 1211 of the under display light field sensor 120. The image processing circuit 820 reconstructs an image of the object (for example, the fingerprint FP) according to the sensing signals SS. The sensing signals SS represent the images of the object (for example, the fingerprint FP) captured from the different directions by the light-field image sensor 121.

Figure 9:
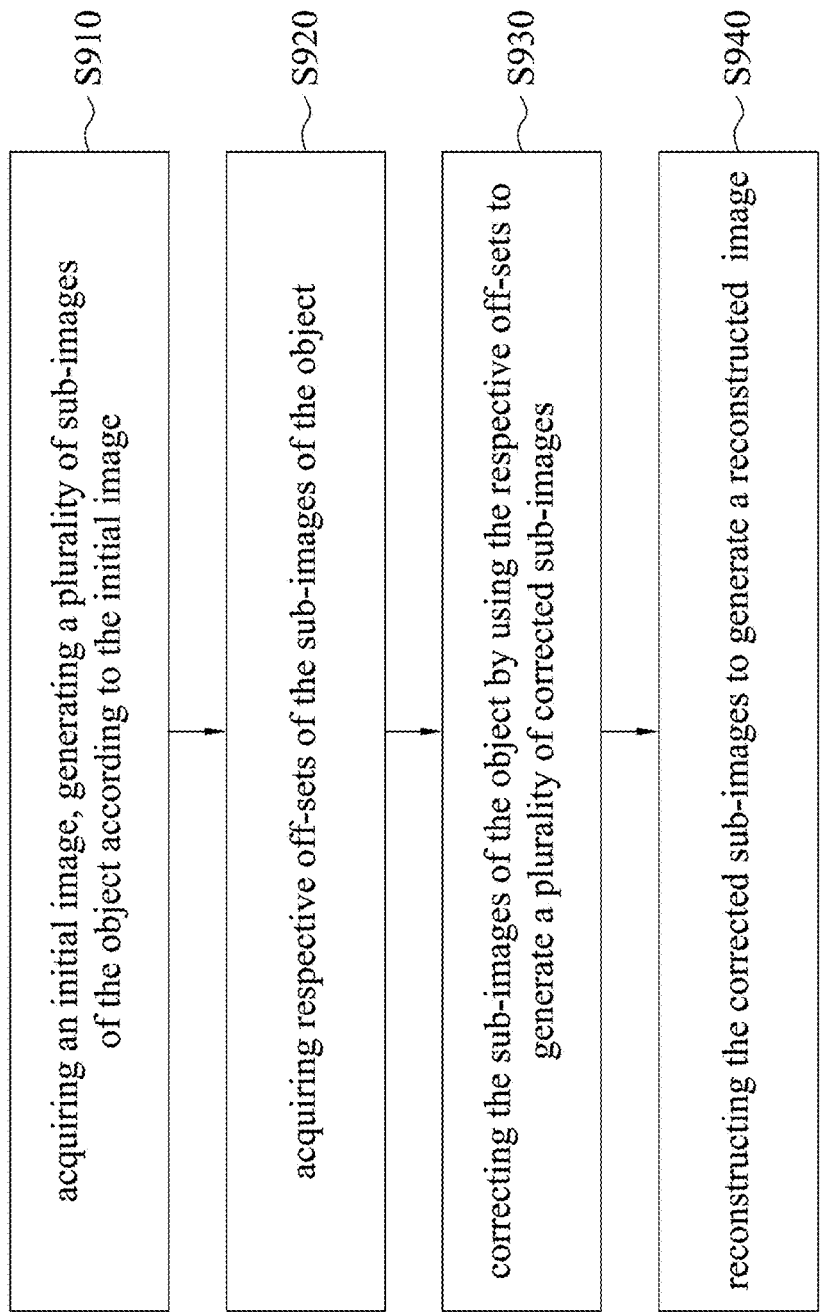
FIG. 9 is a flow diagram illustrating a method for reconstructing an image according to some embodiments of the present disclosure.

Reference is made to FIG. 9. FIG. 9 is a flow diagram illustrating a method 900 for reconstructing an image according to some embodiments of the present disclosure. The method 900 is performed by the image processing circuit 820 in FIG. 8 and the method 900 is for reconstructing the image. The method 900 includes operations S910, S920, S930, and S940.

In operation S910, the sub-image data generator 822 in FIG. 8 acquires an initial image of the object (for example, the fingerprint FP) and generates multiple sub-images according to the initial image. For example, the readout circuit 810 reads out sensing signals SS from the sensing pixels 1211, and then the sub-image data generator 822 groups the sensing signals SS of corresponding ones of the sensing pixels 1211 in the respective subarrays SA1-SAN to generate the sub-images of the object (for example, the fingerprint FP). The corresponding ones of the sensing pixels 1211 in the respective subarrays SA1-SAN are defined at same positions with respect to respective subarrays SA1-SAN, as illustrated in FIG. 10. FIG. 10 is a schematic diagram illustrating the subarrays SA1-SAN of the sensing pixels 1211 according to some embodiments of the present disclosure.

As illustrated in FIG. 10, the sensing pixels 1211 are represented by (a, b), in which "a" represent number values of the sensing pixels 1211 in the respective subarrays SA1-SAN, and "b" represent number values of the sensing pixels 1211 in the respective subarrays SA1-SAN. If each of the subarrays SA1-SAN includes n×m (for example, 5×5) sensing pixels 1211, an initial image acquired by the light-field image sensor 121 includes multiple n×m matrixes, in which "n" represents a number value of rows of each matrix, "m" represents a number value of columns of each matrix. Each matrix includes elements $a_{ij}$, "i" represents the row number of the element $a_{ij}$ and is an integer from 1 to n, and "j" represents the column number of the element $a_{ij}$ and is an integer from 1 to m.

In this example, each of the subarrays SA1-SAN includes 5×5 sensing pixels 1211, so the initial image acquired by the light-field image sensor 121 includes multiple 5×5 matrixes, each of which corresponds to one micro-lens. Each of the matrixes includes elements $a_{ij}$, in which "i" represents the row number of the element $a_{ij}$ and is an integer from 1 to 5, and "j" represents the column number of the element $a_{ij}$ and is an integer from 1 to 5.

Figure 11:
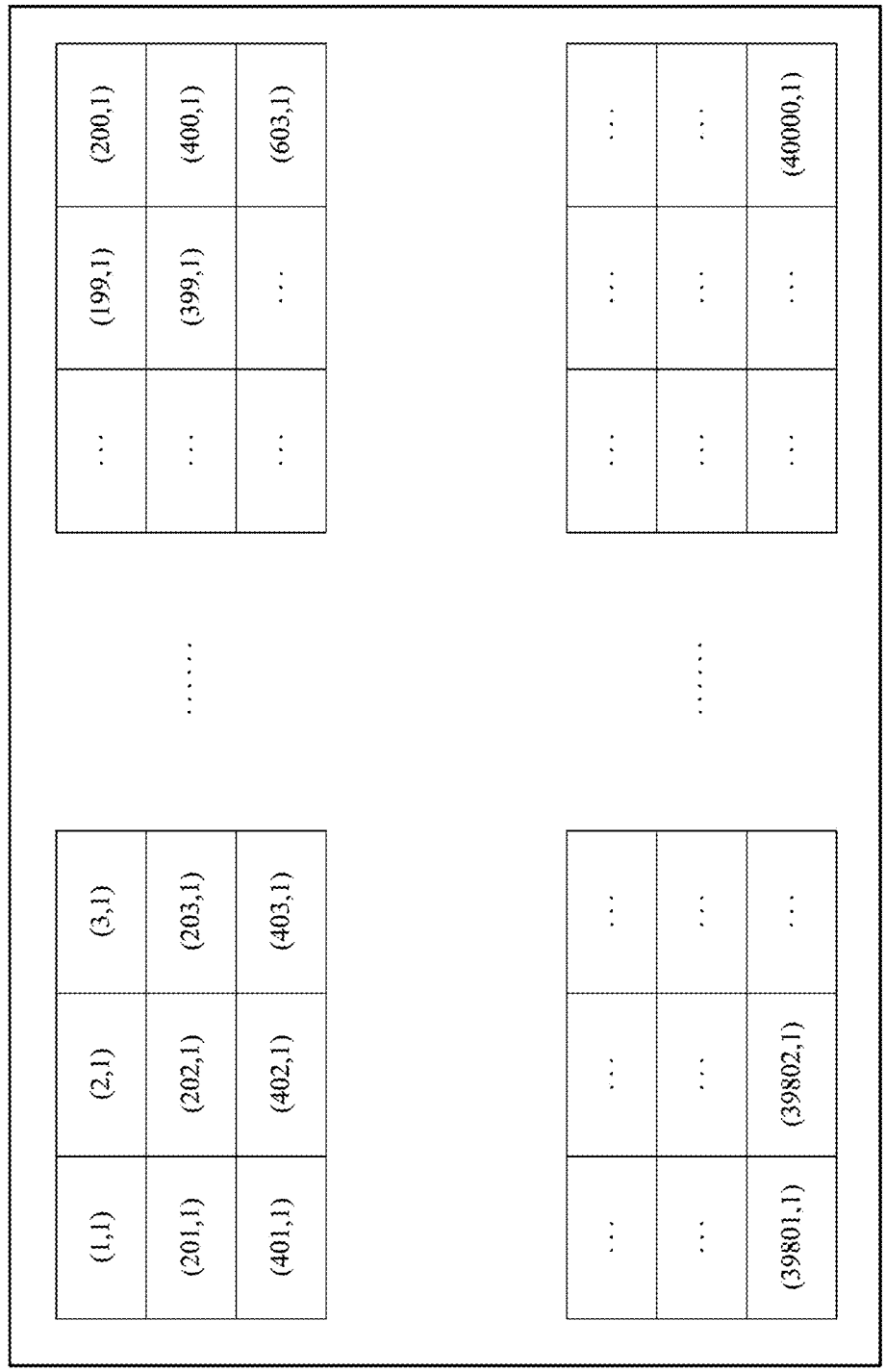
FIG. 11 is a schematic diagram illustrating a sub-image according to some embodiments of the present disclosure.

The sensing pixels 1211 having the same number value of "b" in the respective subarrays SA1-SAN are defined at same positions with respect to the respective subarrays SA1-SAN, and the elements having the same number value of "b" are grouped to generate the sub-images of the object (for example, the fingerprint FP), as illustrated in FIGS. 11-13. Since the number value of "b" is an integer from 1 to n×m, n×m sub-images are acquired. In other words, an amount of the generated sub-images is equal to a value of "n" times "m." In this example, 5×5 sub-images are acquired.

Figure 14:
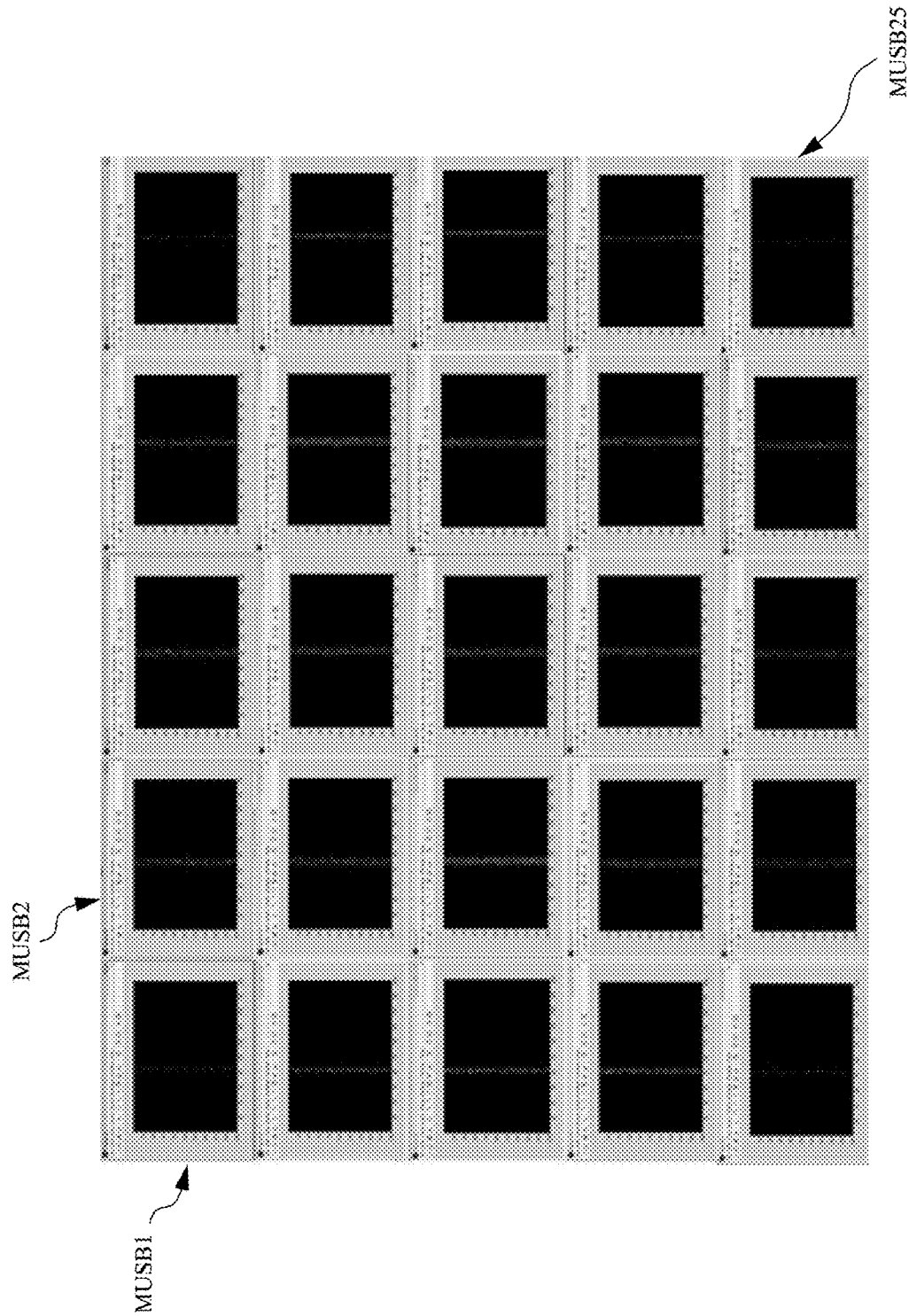
FIG. 14 is a schematic diagram illustrating sub-images according to some embodiments of the present disclosure.

References are made to FIG. 11, FIG. 12, and FIG. 13. FIGS. 11-13 are schematic diagrams illustrating sub-images MSUB1-MSUB2, and MSUB25 of the object (for example, the fingerprint FP) according to some embodiments of the present disclosure. As illustrated in FIG. 11, the sub-image MSUB1 is generated according to the initial image by extracting elements $a_{ij}$, in each of the matrixes, having the same values of "i" and "j" (for example, i=1 and j=1). As illustrated in FIG. 12, the sub-image MSUB2 is generated according to the initial image by extracting elements $a_{ij}$, in each of the matrixes, having the same values of "i" and "j" (for example, i=1 and j=2). As illustrated in FIG. 13, the sub-image MSUB25 is generated according to the initial image by extracting elements $a_{ij}$, in each of the matrixes, having the same values of "i" and "j" (for example, i=5 and j=5). Based on the same rule, 5×5 sub-images MSUB1-MSUB25 of the object (for example, the fingerprint FP) are acquired, as illustrated FIG. 14. FIG. 14 is a schematic diagram illustrating the sub-images MSUB1-MSUB25 according to some embodiments of the present disclosure.

Reference is made to FIG. 15. FIG. 15 is a schematic diagram illustrating offsets according to some embodiments of the present disclosure. In operations S920 and S930 in FIG. 9, the shifting module 824 in FIG. 8 acquires respective off-sets of the sub-images MSUB1-MSUB25 of the object (for example, the fingerprint FP), and then corrects the sub-images MSUB1-MSUB25 of the object (for example, the fingerprint FP) by using the respective off-sets to generate corrected sub-images.

For example, the object (for example, the fingerprint FP) in FIG. 1 is captured in the aforementioned sub-images MSUB1-MSUB25 by the under display light field sensor 120. Positions of the object (for example, the fingerprint FP) in the sub-images MSUB1-MSUB25 can be determined. The position of the finger F in one of the sub-images MSUB1-MSUB25 is determined to be a reference position, and then the off-set of each of the sub-images MSUB1-MSUB25 can be acquired according to the reference position, as illustrated in FIG. 15. It indicates that the object (for example, the fingerprint FP) is closer if an offset is larger, and it indicates that the object (for example, the fingerprint FP) is farther if an offset is smaller. For acquiring absolute offsets, reference values can be designed or calculated, or reference values can be obtained by performing a calibration process and a comparison process before ex-factory. After the offsets of the sub-images MSUB1-MSUB25 are acquired, the shifting module 824 shifts each of the sub-images MSUB1-MSUB25 by a corresponding off-set, to correct the sub-images MSUB1-MSUB25.

Figure 16:
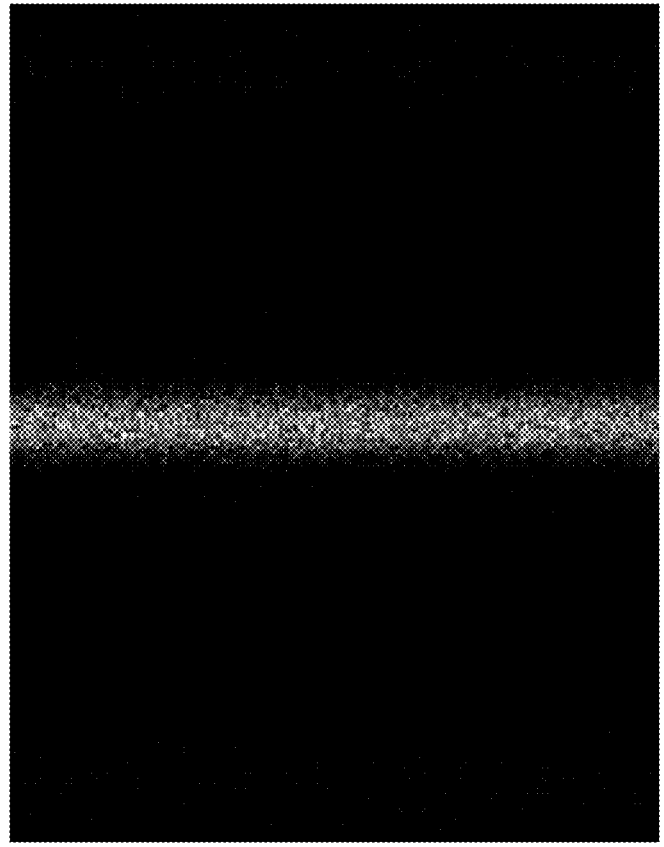
FIG. 16 is a schematic diagram illustrating a combined image according to some embodiments of the present disclosure.
Figure 17:
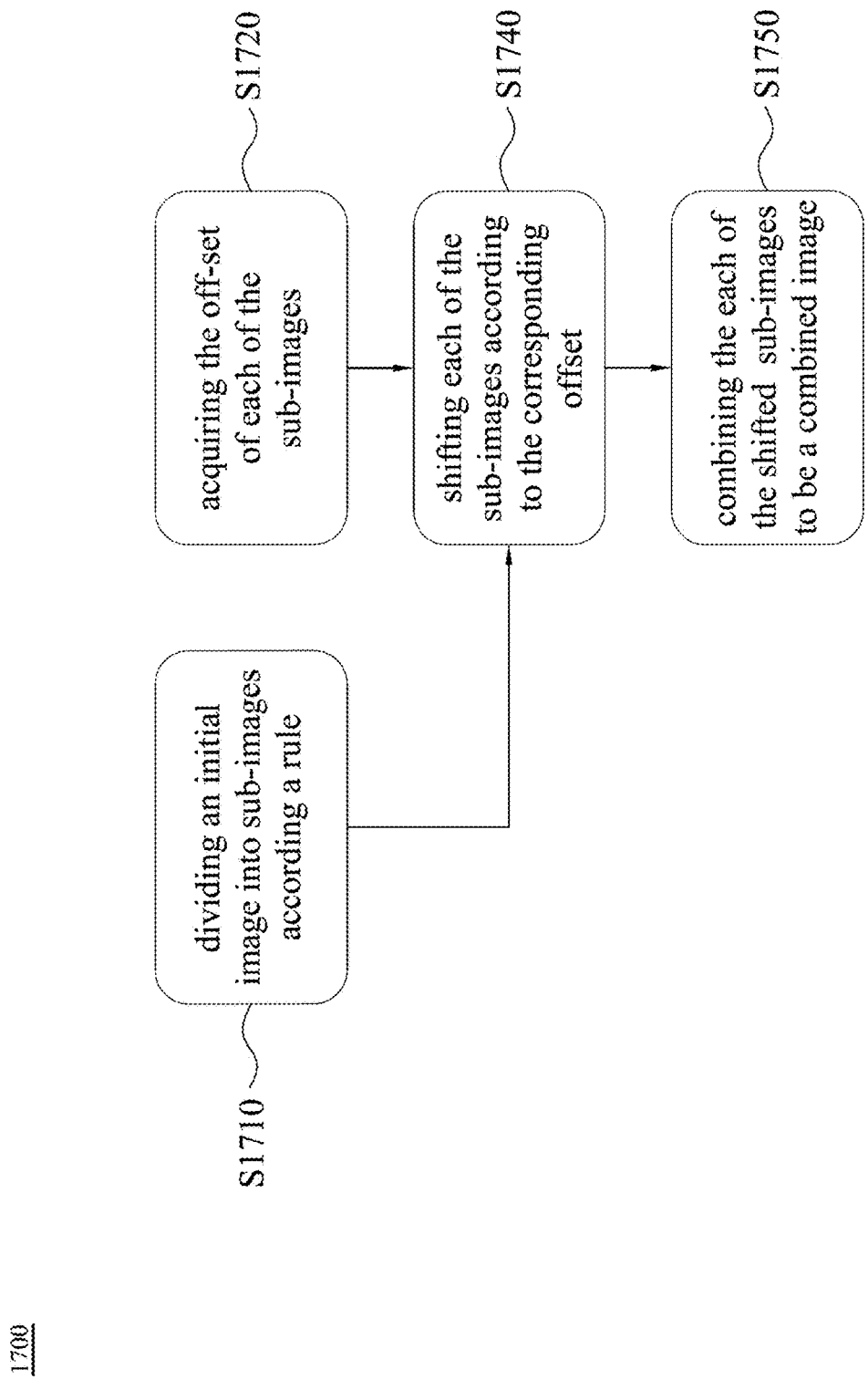
FIG. 17 is a flow diagram illustrating an image combination method according to some embodiments of the present disclosure.

References are made to FIG. 16 and FIG. 17. FIG. 16 is a schematic diagram illustrating a combined image CI according to some embodiments of the present disclosure. FIG. 17 is a flow diagram illustrating an image combination method 1700 according to some embodiments of the present disclosure. In operation S940 in FIG. 9, the image combining module 826 in FIG. 8 reconstructs the corrected sub-images to generate a reconstructed image by combining or superimposing the shifted sub-images of the object (for example, the fingerprint FP). As illustrated in FIG. 17, the image combination method 1700 includes operations S1710, S1720, S1740, and S1750. Operation S1710 is for dividing the initial image into the sub-images MSUB1-MSUB25 according to the aforementioned rule. Operation S1720 is for acquiring the off-set of each of the sub-images MSUB1-MSUB25, as illustrated in FIG. 14. Operation S1740 is for shifting the each of the sub-images MSUB1-MSUB25 according to the corresponding offset, as illustrated in FIG. 15. Operation S1750 is for combining the shifted sub-images MSUB1-MSUB25 to be a combined image CI in FIG. 16 for generating the reconstructed image of the object (for example, the fingerprint FP).

Figure 18:
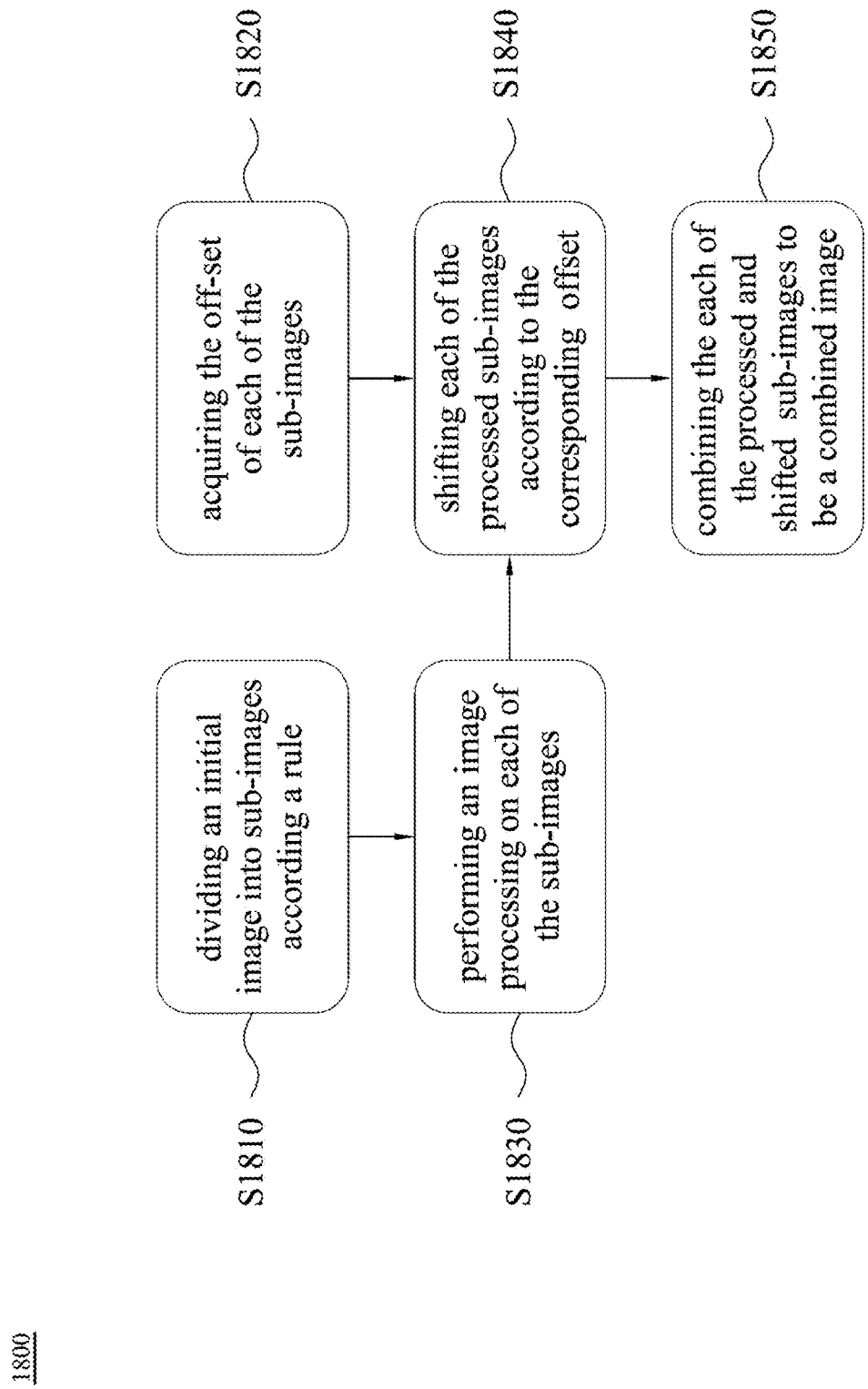
FIG. 18 is a flow diagram illustrating an image combination method according to some embodiments of the present disclosure.

In some embodiments, an image processing may be performed on at least one of the corrected (shifted) MSUB1-MSUB25 prior to combining or superimposing the corrected (shifted) sub-images MSUB1-MSUB25. Reference is made to FIG. 18. FIG. 18 is a flow diagram illustrating an image combination method 1800 according to some embodiments of the present disclosure. As illustrated in FIG. 18, the image combination method 1800 includes operations S1810, S1820, S1830, S1840, and S1850. Operations S1810 and S1820 are similar to operations S1710 and S1720 in FIG. 17. Operation S1830 is for performing an image processing on each of the sub-images MSUB1-MSUB25. The image processing, for example, reducing noise, enhancing contrast or adjusting brightness of the corrected (shifted) MSUB1-MSUB25, or filtering frequency component (for example, low frequency component) of the signals from the corrected (shifted) MSUB1-MSUB25, or a combination thereof. Then, operation S1840 is for shifting each of the processed sub-images MSUB1-MSUB25 according to the corresponding offset. Then, operation S1850 is for combining the processed and shifted sub-images MSUB1-MSUB25 to be a combined image CI for generating a reconstructed image of the object (for example, the fingerprint FP).

In some other embodiments, the image processing may be performed after combining or superimposing the corrected (shifted) MSUB1-MSUB25. In some other embodiments, the image processing may be performed on the initial image acquired by the sub-image data generator 822.

Based on the descriptions above, the under display light field sensor, the device with the under display light field sensor for sensing a fingerprint or touch, and the method for reconstructing the image of the present disclosure can reduce effects caused by the structure of the display panel.

Various functional components or blocks have been described herein. As will be appreciated by persons skilled in the art, in some embodiments, the functional blocks will preferably be implemented through circuits (either dedicated circuits, or general purpose circuits, which operate under the control of one or more processors and coded instructions), which will typically comprise transistors or other circuit elements that are configured in such a way as to control the operation of the circuitry in accordance with the functions and operations described herein. As will be further appreciated, the specific structure or interconnections of the circuit elements will typically be determined by a compiler, such as a register transfer language (RTL) compiler. RTL compilers operate upon scripts that closely resemble assembly language code, to compile the script into a form that is used for the layout or fabrication of the ultimate circuitry.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An under display light field sensor for sensing a fingerprint or touch on or in proximity to a display panel, the under display light field sensor comprising:
    a light-field image sensor comprising a plurality of subarrays of sensing pixels under the display panel, wherein the sensing pixels in an identical one of the subarrays are configured to capture images of an object on or in proximity to the display panel by sensing lights from different directions;
    a plurality of micro-lenses on the subarrays of the sensing pixels, each of the micro-lenses corresponding to one of the subarrays of the sensing pixels; and
    a sensing circuit to generate a plurality of sub-images of the object according to sensing signals of the sensing pixels and shift each of the sub-images of the object by an off-set to generate an image data.

2. The under display light field sensor according to claim 1, wherein the sensing circuit comprises:
    a readout circuit, configured to read out the sensing signals of the sensing pixels, wherein the sensing signals represent the images of the object captured from the different directions by the light-field image sensor; and
    an image processing circuit, configured to reconstruct an image of the object by generating the sub-images of the object according to the sensing signals of the sensing pixels and combining or superimposing the sub-images of the object.

3. The under display light field sensor according to claim 2, wherein the image processing circuit comprises:
    a sub-image data generator configured to group signals of corresponding ones of the sensing pixels in the respective subarrays to generate the plurality of sub-images of the object, wherein said corresponding ones of the sensing pixels in the respective subarrays are defined at same positions with respect to respective subarrays and are grouped to be a same one of the sub-images;
    a shifting module configured to shift each of the sub-images of the object by the off-set; and
    an image combining module configured to reconstruct an image data by combining or superimposing the shifted sub-images of the object.

4. The under display light field sensor according to claim 1, wherein each of the micro-lenses has an axis that is shifted from a geometric center of the corresponding one of the subarrays of the sensing pixels.

5. The under display light field sensor according to claim 1, wherein each of the micro-lenses has an axis that is substantially aligned with a geometric center of the corresponding one of the subarrays of the sensing pixels.

6. The under display light field sensor according to claim 1, further comprising an imaging lens over the micro-lenses, wherein the imaging lens is configured for forming an image of the object on or in proximity to the light-field image sensor.

7. The under display light field sensor according to claim 1, wherein the under display light field sensor is implemented as a fingerprint sensor.

8. The under display light field sensor according to claim 1, wherein the under display light field sensor is configured to perform a floating touch function.

9. The under display light field sensor according to claim 1, further comprising a light shielding structure comprising a plurality of portions disposed between adjacent ones of the micro-lenses.

10. The under display light field sensor according to claim 1, further comprising a light shielding structure comprising a plurality of portions disposed under adjacent ones of the micro-lenses.

11. A device with an under display light field sensor for sensing a fingerprint or touch, comprising:
    a display panel having a display surface and a back surface opposite thereto, wherein the under display light field sensor comprises:
        a plurality of subarrays of sensing pixels facing the back surface; and
        a plurality of micro-lenses between the subarrays of the sensing pixels and the back surface, each of the micro-lenses corresponding to one of the subarrays of the sensing pixels; and
    a sensing circuit,
    wherein the sensing pixels in an identical one of the subarrays are configured to capture images of an object on or in proximity to the display panel by sensing lights from different directions,
    wherein the sensing circuit generates a plurality of sub-images according to sensing signals of the sensing pixels, and shifts each of the sub-images of the object by an off-set to generate an image data.

12. The device according to claim 11, wherein the sensing circuit comprises:
    a readout circuit, configured to read out the sensing signals of the sensing pixels, wherein the sensing signals represent the images of the object captured from the different directions by the under display light field sensor; and
    an image processing circuit, configured to reconstruct an image of the object by generating the sub-images of the object according to the sensing signals of the sensing pixels and combining or superimposing the sub-images.

13. The device according to claim 12, wherein the image processing circuit comprises:
a sub-image data generator configured to group signals of corresponding ones of the sensing pixels in the respective subarrays to generate the plurality of sub-images of the object, wherein said corresponding ones of the sensing pixels in the respective subarrays are defined at same positions with respect to respective subarrays and are grouped to be a same one of the sub-images;
a shifting module configured to shift each of the sub-images of the object by the off-set; and
a combining module configured to reconstruct an image data by combining or superimposing the shifted sub-images of the object.

14. The device according to claim 11, wherein each of the micro-lenses has an axis that is shifted from a geometric center of the corresponding one of the subarrays of the sensing pixels.

15. The device according to claim 11, wherein each of the micro-lenses has an axis that is substantially aligned with a geometric center of the corresponding one of the subarrays of the sensing pixels.

16. The device according to claim 11, further comprising an imaging lens over the micro-lenses, wherein the imaging lens is configured for forming an image of the object on or in proximity to the under display light field sensor.

17. The device according to claim 11, wherein the under display light field sensor is implemented as a fingerprint sensor.

18. The device according to claim 11, wherein the under display light field sensor is configured to perform a floating touch function.

19. The device according to claim 11, further comprising a light shielding structure comprising a plurality of portions disposed between adjacent ones of the micro-lenses.

20. The device according to claim 11, further comprising a light shielding structure comprising a plurality of portions disposed under adjacent ones of the micro-lenses.

21. A method for reconstructing an image sensed by a under display light field sensor for sensing for sensing a fingerprint or touch on or in proximity to a display panel, the under display light field sensor comprising: a light-field image sensor comprising a plurality of subarrays of sensing pixels under the display panel, wherein the sensing pixels in an identical one of the subarrays are configured to capture images of an object on or in proximity to the display panel from different directions; and a plurality of micro-lenses on the subarrays of the sensing pixels, each of the micro-lenses corresponding to one of the subarrays of the sensing pixels, the method comprising:
acquiring an initial image, generating a plurality of sub-images of the object according to the initial image;
acquiring respective off-sets of the sub-images of the object;
correcting the sub-images of the object by using the respective off-sets to generate a plurality of corrected sub-images; and
reconstructing the corrected sub-images to generate a reconstructed image.

22. The method according to claim 21, wherein the initial image comprises a plurality of n×m matrixes, each matrix including elements $a_{ij}$, wherein "n" represents a number value of rows of each matrix, "m" represents a number value of columns of each matrix, "i" represents the row number of the element $a_{ij}$ and is an integer from 1 to n, and "j" represents the column number of the element $a_{ij}$ and is an integer from 1 to m,
wherein the generating the sub-images of the object according to the initial image comprises extracting elements $a_{ij}$ having the same values of "i" and "j" in each of the matrixes to generate a same one of the sub-images, wherein an amount of the sub-images of the object is equal to a value of "n" times "m".

23. The method according to claim 21, further comprising:
processing at least one of the sub-images of the object prior to superimposing the corrected sub-images to generate a reconstructed image.

24. The method according to claim 23, wherein processing at least one of the sub-images of the object comprises reducing noise, enhancing contrast or adjusting brightness of said at least one of the sub-images of the object, or filtering frequency component of signals from said at least one of the sub-images of the object, or a combination thereof.

25. The method according to claim 21, further comprising:
processing the reconstructed image after superimposing the corrected sub-images.

26. The method according to claim 25, wherein the processing the reconstructed image comprises reducing noise, enhancing contrast or adjusting brightness of reconstructed image, or filtering frequency component of signals from the reconstructed image, or a combination thereof.

27. The method according to claim 21, wherein the generating the sub-images of the object according to the initial image comprises grouping signals of corresponding ones of the sensing pixels in the respective subarrays to generate the sub-images of the object of the object, wherein said corresponding ones of the sensing pixels in the respective subarrays are defined at same positions with respect to respective subarrays and are grouped to be a same one of the sub-images of the object.

28. The method according to claim 27, wherein the sensing pixels of the subarrays are represented by (a, b), wherein "a" represent number values of the respective subarrays, and "b" represent number values of the sensing pixels in the respective subarrays, wherein the sensing pixels having the same number value of "b" in the respective subarrays are defined at same positions with respect to the respective subarrays, and wherein the generating the sub-images of the object according to the initial image comprises grouping the signals of the sensing pixels having the same number value of "b" to generate a same one of the sub-images of the object.

29. The method according to claim 21, wherein the correcting the sub-images of the object by using the respective off-sets to generate a plurality of corrected sub-images comprises shifting each of the sub-images of the object by the off-sets.

30. The method according to claim 29, wherein the reconstructing the corrected sub-images comprises superimposing or combining the shifted sub-images of the object.

* * * * *